(12) United States Patent
Kischkat et al.

(10) Patent No.: US 10,162,081 B2
(45) Date of Patent: Dec. 25, 2018

(54) DOWNHOLE FLUID TYPING

(71) Applicant: BAKER HUGHES INCORPORATED, Houston, TX (US)

(72) Inventors: Tobias Kischkat, Celle (DE); Eick Niemeyer, Celle (DE); Stefan Sroka, Adelheidsdorf (DE)

(73) Assignee: BAKER HUGHES A GE COMPANY, LLC, Houston, TX (US)

( * ) Notice: Subject to any disclaimer, the term of this patent is extended or adjusted under 35 U.S.C. 154(b) by 346 days.

(21) Appl. No.: 14/820,142

(22) Filed: Aug. 6, 2015

(65) Prior Publication Data

US 2017/0038496 A1 Feb. 9, 2017

(51) Int. Cl.
*G01V 99/00* (2009.01)
*E21B 49/00* (2006.01)

(52) U.S. Cl.
CPC ............ *G01V 99/005* (2013.01); *E21B 49/00* (2013.01); *G01V 2210/667* (2013.01)

(58) Field of Classification Search
CPC .............................. G01V 99/005; E21B 49/00
USPC ........................................................ 702/11
See application file for complete search history.

(56) References Cited

U.S. PATENT DOCUMENTS

| | | | |
|---|---|---|---|
| 6,302,221 B1 | 10/2001 | Hamman et al. | |
| 8,093,893 B2 | 1/2012 | Niemeyer et al. | |
| 8,393,207 B2 | 3/2013 | Fujisawa et al. | |
| 2010/0259266 A1 | 10/2010 | Minh et al. | |
| 2010/0268470 A1 | 10/2010 | Kamal et al. | |
| 2011/0068788 A1 | 3/2011 | Minh | |

FOREIGN PATENT DOCUMENTS

| | | |
|---|---|---|
| WO | 2014003840 A1 | 1/2014 |
| WO | 2014200861 A1 | 12/2014 |

OTHER PUBLICATIONS

Int'l Search Report & Written Opinion in PCT/US2016/045634 dated Nov. 17, 2016.

*Primary Examiner* — Anthony Ho
(74) *Attorney, Agent, or Firm* — Mossman, Kumar & Tyler, PC

(57) ABSTRACT

Systems, devices and methods for evaluating a volume of interest of an earth formation. The method may include modeling the volume as being in one of two states using a plurality of measurements corresponding to a plurality of measurement types, and may include assigning a relative credence indicator value to each measurement in dependence upon the corresponding measurement value and using the relative credence indicator value for each of the plurality of measurements to estimate the state of the volume by estimating the state of the volume using a state indicator value derived from the relative credence indicator values. The first state of the two states may correspond with presence of a condition associated with the formation, and the second state of the two states may correspond with absence of the condition. The condition may comprise presence of a fluid in the formation having a selected fluid type.

18 Claims, 11 Drawing Sheets

R1

Kg/m³

1e⁻⁹ Pa⁻¹

R1

Kg/m³

DOWNHOLE FLUID TYPING

FIELD OF THE DISCLOSURE

This disclosure relates generally to evaluation of underground formations using multiple sensor measurements, and more particularly to systems and methods for sampling and testing downhole fluids.

BACKGROUND

Commercial development of hydrocarbon fields requires significant amounts of capital. Before field development begins, operators desire to have as much data as possible in order to evaluate the reservoir for commercial viability. It is often desirable to conduct testing of the possible hydrocarbon reservoirs in order to obtain useful data. Therefore, during drilling or after a borehole for a well has been drilled, a particular volume of the subterranean earth formation may be evaluated. As part of this evaluation, fluid samples may be analyzed.

SUMMARY OF THE DISCLOSURE

In aspects, the present disclosure provides methods for evaluating an earth formation intersected by a borehole. The method may include modeling a volume of the earth formation proximate the borehole as being in one of two states using a plurality of measurements corresponding to a plurality of measurement types. The first state of the two states may correspond with presence of a condition associated with the formation, and the second state of the two states may correspond with absence of the condition. The modeling may include assigning a relative credence indicator value to each measurement in dependence upon the corresponding measurement value. The method further includes using the relative credence indicator value for each of the plurality of measurements to estimate the state of the volume, which may include estimating the state of the volume using a state indicator value derived from the relative credence indicator values, such as for example, by using a sum of relative credence indicator values, an average of the relative credence indicator values, or a weighted average of the relative credence indicator values. Using the relative credence indicator value for each of the plurality of measurements to estimate the state of the volume may include individually weighting the relative credence indicator value for each of the plurality of measurements. The relative credence indicator values may be weighted responsive to at least one of: i) indication of sensor failure; ii) borehole conditions; iii) predicted state; iv) estimated state for a different condition; and v) operational conditions.

The relative credence indicator value is indicative of which state of the two states is more likely based on the corresponding measurement value and the relative likelihood of the likelier state. The relative credence indicator value assigned to the corresponding measurement value may be indicative of which state of the two states is more likely based solely on the corresponding measurement value or on other factors. Using the relative credence indicator value for each of the plurality of measurements may include using the value independent of the corresponding measurement value.

The condition may comprise presence of a fluid in the formation having a selected fluid type. The volume may include the borehole. The selected fluid type may comprise at least one of i) water; ii) oil; and iii) natural gas.

The relative credence indicator value may be a numerical value in an interval. The interval may include i) a first endpoint representing absolute certainty that the volume is in the first state, ii) a second endpoint representing absolute certainty that the condition is in the second state, and iii) an intermediate point on the interval between the endpoints representing absolute uncertainty with regard to the present state of the volume. The interval may include both positive and negative values; the intermediate point may be zero.

The method may include estimating the state of the volume as the first state in response to at least one of: i) the state indicator value lies in a first region between the intermediate point and the first endpoint; and ii) the state indicator value lies in a second region outside the interval past a threshold value beyond the first endpoint from the intermediate point.

The method may include estimating the state of the volume as the second state in response to at least one of: i) the state indicator value lies in a third region between the intermediate point and the second endpoint; and ii) the state indicator value lies in a fourth region outside the interval past a threshold value beyond the second endpoint from the intermediate point.

The method may include conducting further operations in the earth formation in dependence upon the estimation. Further operations may include at least one of: i) extending the borehole; ii) drilling additional boreholes in the formation; iii) performing seismic measurements on the formation; iv) performing borehole logging in the formation; v) installing casing in the borehole; vi) evaluating casing installed in the borehole; vii) obtaining a sample in a sample container; viii) producing one or more hydrocarbons from the formation.

The method may include displaying a representation of a model resulting from the modeling. The representation may include displaying a first color scale in connection with sums lying in the first region and the second region; and displaying a second color scale in connection with a state indicator value lying in the third region and the fourth region.

In aspects, the present disclosure includes a formation evaluation apparatus. The apparatus may include at least one processor configured to model a volume of the earth formation proximate the borehole as being in one of two states using a plurality of measurements corresponding to a plurality of measurement types, wherein: a first state of the two states corresponds with presence of a condition associated with the formation, and a second state of the two states corresponds with absence of the condition, wherein the modeling includes assigning a relative credence indicator value to each measurement in dependence upon the corresponding measurement value, the relative credence indicator value indicative of which state of the two states is more likely based on the corresponding measurement value and the relative likelihood of the likelier state; and using the relative credence indicator value for each of the plurality of measurements to estimate the state of the volume.

The apparatus may also include a carrier conveyed in a borehole; a first sensor associated with the carrier and configured to make a first portion of the plurality of measurements; and a second sensor associated with the carrier and configured to make a second portion of the plurality of measurements. The first sensor may be configured to make measurements of a first type and the second sensor may be configured to make measurements of a second type.

Examples of certain features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals.

DETAILED DESCRIPTION

Figure 1A:
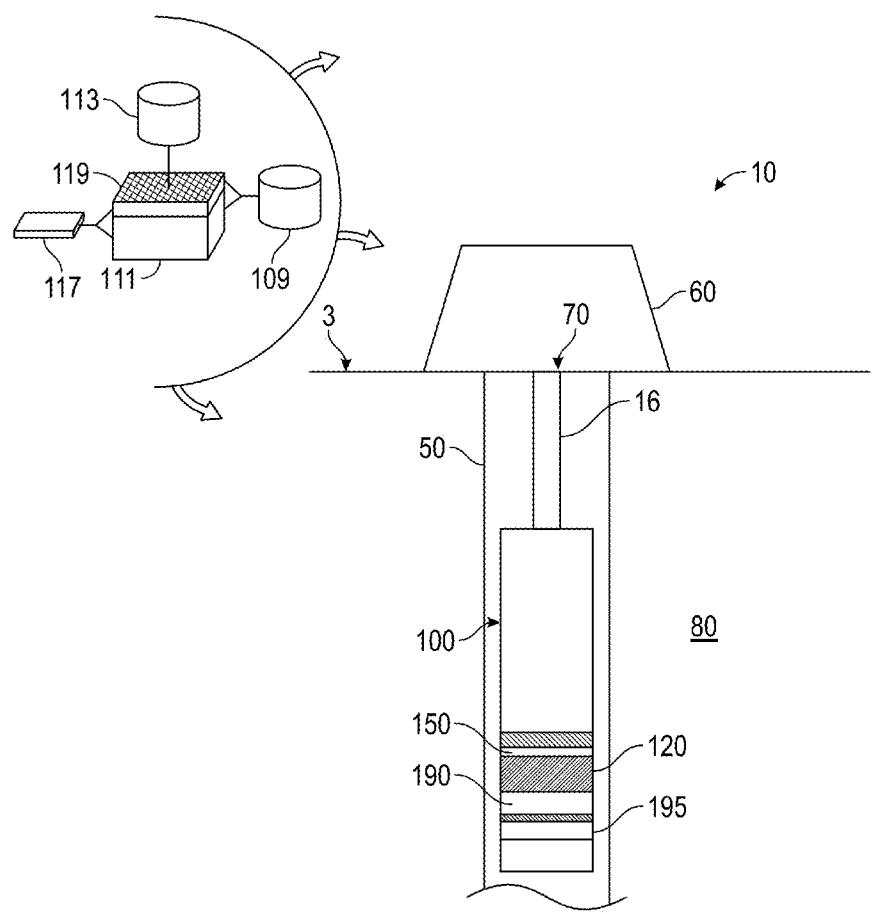
FIG. 1A shows a schematic illustration of a system including a downhole tool in accordance with embodiments of the present disclosure.

Aspects of the present disclosure relate to modeling a volume of an earth formation. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

In particular, embodiments of the present disclosure include modeling a volume of the earth formation proximate the borehole as being in one of two states using a plurality of measurements corresponding to a plurality of measurement types, wherein a first state corresponds with presence of a condition associated with the formation, and a second state corresponds with absence of the condition; and estimating the state of the volume. Thus, the states may be mutually exclusive.

That is, aspects of the invention include estimating which state the volume is in: condition absent or condition present. The method may further include using the model to estimate a parameter of interest of the volume, a borehole intersecting the volume, or downhole fluids in the volume or the borehole.

General embodiments include devices and methods for evaluating a downhole fluid from a borehole intersecting an earth formation. This evaluation may include the use of various measurements taken using a variety of instruments. The measurements are reflective of the state of the volume, such as a volume of fluid. A sampling instrument may be conveyed in (or permanently located within) a cased or open borehole or a pipeline tubular transporting downhole fluids. The downhole fluid may be sampled internal to the tool or externally, such as, for example, in a fluid-filled annulus between the tool and the borehole wall.

Optical spectrometers suitable for downhole fluid typing (e.g., UV/VIS, NIR, etc.) are known in the art, as are basic appropriate workflows employing such devices. However, these instruments may prove expensive and difficult to maintain. Additionally, inclusion of these instruments on a tool while adhering to other design constraints can be problematic, particularly for legacy tools.

Many other robust instruments are available, but in particular environmental conditions, the quality of the information obtained with such sensors has been insufficient for reliable qualitative or quantitative fluid composition analysis.

As one example, the condition determined may be the presence of a fluid in the volume having a selected fluid type, such as water, oil, natural gas, drilling fluids, and so on. This is sometimes referred to in the art as "fluid typing."

Multiple fluid types may be selected for determination, and the absence or presence of each fluid type may be individually modeled in accordance with novel aspects of the present disclosure. In some implementations, fluid type (gas, oil, water) may be determined while pumping fluid from a formation downhole.

Fluid typing may be carried out based on a standard set of sensors, and may also employ a priori knowledge about the mud type, e.g., oil-based mud ('OBM') or water-based mud ('WBM'). Standard sensors may measure compressibility, sound speed, refractive index, density, and the like. In extreme environments, these sensors (and the data quality achieved in the downhole environment) may not provide enough information for qualitative or quantitative fluid composition analysis for the requirements of a particular project. Sound speed may be completely inconclusive in various fluid mixtures due to boundary layer reflections, refractometer measurements rely on a thin film of fluid on the window, and both tuning fork results and refractometer results may be biased by material adhered to the sensor (i.e., fouling). Measurement ranges for several fluid components may overlap. Mud-based fluids are often indistinguishable from formation fluids, so "oil" can mean base oil or formation oil or any mixture of the two. The same applies to "water."

The present disclosure utilizes information from these sensors. In some aspects, this includes converting the measurements (relating to e.g., density, compressibility, resistivity, magnetic resonance, refractive index, etc.) from each sensor into an indicator which reflects both the likeliest state and the certainty of this estimation. Then the indicator from each sensor is used in synergistic combination to estimate the state of the volume with respect to the condition. In this way, modeling is improved without the need to retrofit legacy tools. Indeed, even sensors failing to provide good data may yield some context, which may be combined with other sensor data to estimate the state of the volume.

In aspects of the invention, this modeling may include assigning a relative credence indicator value ('RCIV') to each measurement in dependence upon the corresponding measurement value. The relative credence indicator value is indicative of i) which state of the two states is more likely based on the corresponding measurement value, and ii) the relative likelihood of the likelier state based on the measurement. The indicator values from the various measurements are then aggregated and used to derive a single value indicative of the state of the volume.

In some fluid typing implementations, a single numerical value may be associated with each component (e.g., oil, gas, water, etc). The value may be between −1 and 1. In some frameworks, a negative value indicates that this component is probably not present in the fluid, while a positive value indicates that this component is probably part of the fluid.

The teachings may be advantageously applied to a variety of systems in the oil and gas industry, water wells, geothermal wells, surface applications and elsewhere. Merely for clarity, certain non-limiting embodiments will be discussed in the context of tools configured for wellbore uses. Each of the borehole embodiments herein may be used in a variety of settings in both drilling and non-drilling environments, including production environments. In some implementations, the disclosed embodiments may be used as part of a drilling system.

Measurement

FIG. 1A shows a schematic illustration of a system including a downhole tool in accordance with embodiments of the present disclosure. The downhole tool 100 may be used to sample fluids from a desired location e.g., a hydrocarbon bearing reservoir and to take measurements of the sampled fluid. Additionally or alternatively, the downhole tool may be used to take measurements indicative of properties of the formation (including the formation as a whole, the fluid contained therein, or the porous matrix) or the borehole.

The system 10 may include a conventional derrick 60 erected on a derrick floor 70. A conveyance device 16 which may be rigid or non-rigid, may be configured to convey the downhole tool 100 into wellbore 50 (also called the borehole) in proximity to formation 80. The conveyance device 16 may be a drill string, coiled tubing, a slickline, an e-line, a wireline, etc. Downhole tool 100 may be coupled or combined with additional tools. Thus, depending on the configuration, the tool 100 may be used during drilling and/or after the wellbore 50 has been formed. While a land system is shown, the teachings of the present disclosure may also be utilized in offshore or subsea applications. The conveyance device 16 may include embedded conductors for power and/or data for providing signal and/or power communication between the surface and downhole equipment. For example, the conveyance device 16 can also provide communications between the downhole tool 100 and a processor disposed at the surface of the earth 3. The conveyance device 16 may include a bottom hole assembly, which may include a drilling motor for rotating a drill bit.

System 10 includes a tool 100 that may be conveyed into a borehole 50 intersecting an earth formation 80. The tool 100 may be conveyed through the borehole 50 by a conveyance device 16. The earth formation 80 may include any subsurface material of interest such as a downhole fluid. The downhole tool 100 may include sensor assemblies, noted for convenience as 190, 195. Sensor assemblies 190, 195 may be contained in a single tool or distributed about the tool string, the surface, or at other locations in the borehole or the formation.

The sensor assemblies 190, 195 may include one or more of sensors configured for evaluation of the borehole or the formation according to known techniques, for taking measurements indicative of drilling parameters, borehole properties, formation properties, telemetry or for other parameters of interest. These sensors may detect one or more parameters of a volume of the formation or of the fluid. Parameters of a formation may include information relating to a geological parameter, a geophysical parameter, a petrophysical parameter, and/or a lithological parameter. Thus, the sensors 190, 195 may include sensors for estimating formation resistivity, dielectric constant, the presence or absence of hydrocarbons, acoustic porosity, bed boundary, formation density, nuclear porosity and certain rock characteristics, permeability, capillary pressure, and relative permeability. It should be understood that this list is illustrative and not exhaustive. Herein, "information" may include raw data, processed data, analog signals, and digital signals.

Sensors 190, 195 may alternatively or additionally detect one or more parameters of the wellbore, including parameters relating to downhole fluids. Non-limiting examples of downhole fluids include drilling fluids, return fluids, formation fluids, production fluids containing one or more hydrocarbons, oils and solvents used in conjunction with downhole tools, water, brine, engineered fluids, and combinations thereof.

In further examples, the sensors may provide information relating to a geological parameter, a geophysical parameter, a petrophysical parameter, and/or a lithological parameter. Example sensors may include formation evaluation sensors such as resistivity sensors, nuclear magnetic resonance (NMR) sensors, gamma ray detectors, and other sensors.

In order to operate the downhole tool 100 and/or provide a communications interface with at least one processor at the surface, the downhole tool 100 may include a downhole processor (not shown). In one embodiment, electronics (not shown) associated with the sensors may be configured to record information related to the parameters to be estimated. In some embodiments, the parameter of interest may be estimated using the recorded information.

In other embodiments, such electronics may be located elsewhere (e.g., at the surface). To perform estimation of a parameter during a single trip, the tool may use a "high bandwidth" transmission to transmit the information acquired by sensors to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control the treatment activity in "real time."

In some embodiments, processors may include electromechanical and/or electrical circuitry configured to control one or more components of the tool 100. In other embodiments, processors may use algorithms and programming to receive information and control operation of the tool 100. Therefore, the tool may include a hardware environment including one or more processors. Certain embodiments of the present disclosure may be implemented with a hardware environment that includes an information processor 111, an information storage medium 113, an input device 117, processor memory 119, and may include peripheral information storage medium 109. The hardware environment may be in the well, at the rig, or at a remote location. Moreover, the several components of the hardware environment may be distributed among those locations. The input device 117 may be any data reader or user input device, such as data card reader, keyboard, USB port, etc. The information storage medium 113 stores information provided by the detectors. Information storage medium 113 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage.

Information storage medium 113 stores a program that when executed causes information processor 111 to execute the disclosed method. Information storage medium 113 may also store the formation information provided by the user, or the formation information may be stored in a peripheral information storage medium 109, which may be any standard computer information storage device, such as a USB drive, memory stick, hard disk, removable RAM, or other commonly used memory storage system known to one of ordinary skill in the art including Internet based storage. Information processor 111 may be any form of computer or mathematical processing hardware, including Internet based hardware. When the program is loaded from information storage medium 113 into processor memory 119 (e.g. computer RAM), the program, when executed, causes information processor 111 to retrieve detector information from either information storage medium 113 or peripheral information storage medium 109 and process the information to estimate a parameter of interest. Information processor 111 may be located on the surface or downhole. Herein, "information" may include raw data, processed data, analog signals, and digital signals The control unit, and processors described herein generally, may also be implemented with an application specific integrated circuit ('ASIC'), field-programmable gate array ('FPGA'), or other digital or analog logical circuitry.

In embodiments of the present disclosure, the downhole tool 100 is a downhole fluid sampling tool including sensors for estimating parameters of a downhole fluid. Non-limiting examples of downhole fluids include drilling fluids, return fluids, formation fluids, production fluids containing one or more hydrocarbons, oils and solvents used in conjunction with downhole tools, water, brine, engineered fluids, and combinations thereof. The downhole tool 100 includes fluid test instrument 120 with a sensor 150 for estimating parameters of a downhole fluid such as, for example, density, viscosity, and/or other parameters. Fluid test instrument 120 may be operatively connected to a processor in order to operate the fluid test instrument 120 and/or provide a communications interface with other processors. Processors may be incorporated into or may be associated with fluid test instrument 120.

Figure 1B:
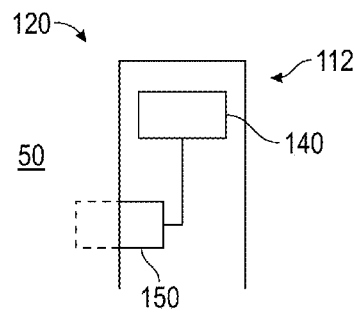
FIG. 1B illustrates an instrument including a sensor in accordance with embodiments of the invention.

FIG. 1B illustrates an instrument including a sensor in accordance with embodiments of the invention. The tool 100 is configured to be conveyed in a borehole 50. A sensor 150 configured to measure a downhole parameter is mounted on the tool 100. Sensor 150 may be any of the sensors disclosed herein. Sensor 150 may include, for example, one or more of a flexural mechanical resonators (FMRs) including a magnetic element, for example, for vibrating or oscillating in the downhole fluid with an oscillation characteristic related to the parameter being measured; a nuclear magnetic resonance ('NMR') component used to analyze fluid samples in fluid sampling tools in a flow line or other sample chamber under downhole conditions; and so on. The sensor 150 may also include a photodiode, other semiconductor elements, time-of-flight acoustic sensors, electrical sensors, light source, other energy emitting elements, and/or other vibratory sensors. The sensor is physically responsive to a property of the fluid. That is, the sensor response is detected and converted to an electrical signal and information embodied by the electrical signal is processed to estimate at least one parameter of the downhole fluid, which may be referred to as a measurement.

In some embodiments, some (or all) of the sensor 150 may protrude from the tool body 112 into the borehole 50. In other embodiments, the tool 100 may include a fluid testing assembly configured to extract downhole fluid from the borehole and deliver the fluid to the sensor for testing. The fluid testing assembly may include a sample chamber which may be filled and emptied via the use of various valves, or may operate using a continuous flow line. In particular embodiments, a fluid mover such as a single-action or dual action piston pump may be used. In some embodiments, the fluid mover may include a draw piston. The pumps may be energized by the same power source or independent power sources. The power source may be electric, hydraulic, pneumatic, etc. Additional samples may be drawn and tested in the same location, or the tool may be moved to various locations along the borehole and re-engaged with the borehole wall to draw and test additional samples. In other embodiments, the fluid test instrument may sample and measure fluid without engagement of the borehole wall.

Tool 100 may include circuitry directing and controlling the taking of measurements using the instrument. Circuitry may include controller 140 operatively connected to the sensor 150. Controller 140 may be implemented as the at least one processor described above with respect to FIG. 1A or may be an additional processor or other supporting circuitry. Controller 140 may be located at the sensor, at other locations in the tool (including, for example, in other subs), or at the surface.

In some arrangements, the sampling event may be human initiated. For example, sensors may transmit signals representative of one or more selected operating parameters to the surface. Based on these measurements, a human operator may initiate a sampling event. In other arrangements, various processors may be used, alone or in combination, to control the operation of tool 100 to ensure that sample retrieval occurs at desired times and/or at specified conditions.

Figure 2:
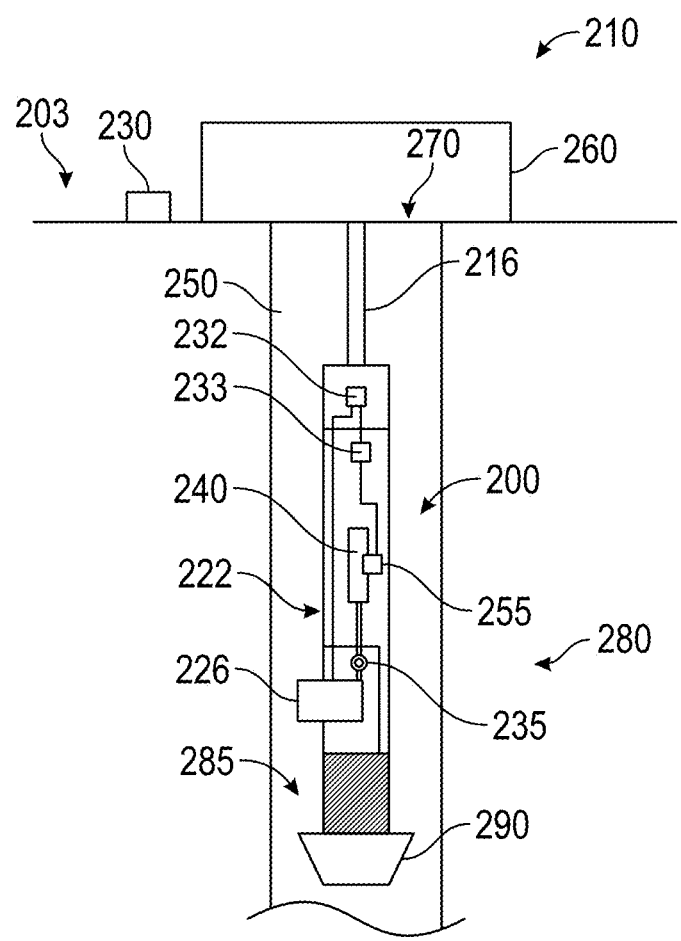
FIG. 2 illustrates a logging-while-drilling ('LWD') or measurement-while-drilling ('MWD') fluid test instrument in accordance with embodiments of the invention.

FIG. 2 illustrates a logging-while-drilling ('LWD') or measurement-while-drilling ('MWD') fluid test instrument 222, which includes collector 226 configured to gather a downhole fluid from outside of the tool for analysis downhole. For example, the collector 226 may extract wellbore fluids, formation fluid from the formation 280, and so on. The fluid test instrument 222 also includes a sample chamber 240 and sensor 255.

The system 210 may include a conventional derrick 260 erected on a derrick floor 270. A drill string 216, which may be rigid or non-rigid, may be configured to convey the downhole tool 220 into wellbore 250 (also called the borehole) in proximity to formation 280 as it operates to extend the borehole 250 by rotation of a drill bit 290 at the distal end of the tool 220. The drill bit 290 may be rotated at the distal end of a bottom hole assembly 285, which may include a drill collar. The bottom hole assembly may include a drilling motor for rotating the drill bit. Borehole 250 may intersect formation 280. Although a drill string is shown, other embodiments may implement the system using, for example, coiled tubing, a slickline, an e-line, a wireline, a production assembly, tractor assisted devices, etc.

Downhole tool 200 may be coupled or combined with additional tools. While a land system is shown, the teachings of the present disclosure may also be utilized in offshore or subsea applications. The drill string 216 may include embedded conductors for power and/or data for providing signal and/or power communication between the surface and downhole equipment. For example, the drill string 216 can also provide communications between the downhole tool 220 and a surface controller 230 disposed at the surface of the earth 203. The earth formation 280 may include any subsurface material of interest such as a downhole fluid. The downhole tool 220 may include sensors for estimating parameters relating to the formation 280.

In order to operate the downhole tool 220 and/or provide a communications interface with the surface controller 230, the downhole tool 220 may include a downhole controller 232. In some embodiments, controllers 232, 233 may include mechanical, electromechanical, and/or electrical circuitry configured to control one or more components of the tool 220. In other embodiments, controllers 232, 233 may use algorithms and programming to receive information and control operation of the tool 220. Therefore, controllers 232, 233 may include a processor that is in data communication with a data storage medium and a processor memory, as described above with reference to FIG. 1A.

The downhole tool 220 includes fluid tester 222 with a sensor 255 for estimating parameters of a downhole fluid such as, for example, density, viscosity, and/or other parameters. Fluid tester 222 is operatively connected to instrument controller 233 in order to operate the fluid tester 222 and/or provide a communications interface with other controllers. Instrument controller 233 may be incorporated into downhole controller 232, or may be associated with fluid tester 222. Sensor 255 may include, for example, an optical sensor assembly, a resonator assembly, an acoustic transducer assembly, or other sensors in accordance with the present disclosure.

In the embodiment depicted in FIG. 2, the fluid tester 222 includes collector 226 configured to gather a downhole fluid from outside of the tool for analysis downhole. For example, the collector 226 may extract wellbore fluids, formation fluid from the formation 280, and so on. The fluid tester 222 also includes a sample chamber 240.

The collector 226 includes a fluid mover 235 that sends a sample of the gathered downhole fluids to the sample chamber 240, where sensor 255 takes measurements of the sample. The sensor 255 is in contact with the sample in the sample chamber 240. For example, in the case of a resonator assembly, a portion of a magnetic tine head is immersed in the downhole fluid in the sample chamber. Control of the sensor 255 may be performed by downhole controller 232 or instrument controller 233.

Tool 220 may include embodiments with elastomeric pads urged against the borehole wall, or may draw fluid from the annulus between the borehole wall and the tool. Other embodiments may sample fluid moving continuously through a flow line. In particular embodiments, the fluid mover may be a single-action or dual action piston pump. The pumps may be energized by the same power source or independent power sources. The power source may be electric, hydraulic, pneumatic, etc. The tool 220 may include anchoring, stabilizing and sealing elements disposed on a drill string, such as grippers and packers.

Figure 3:
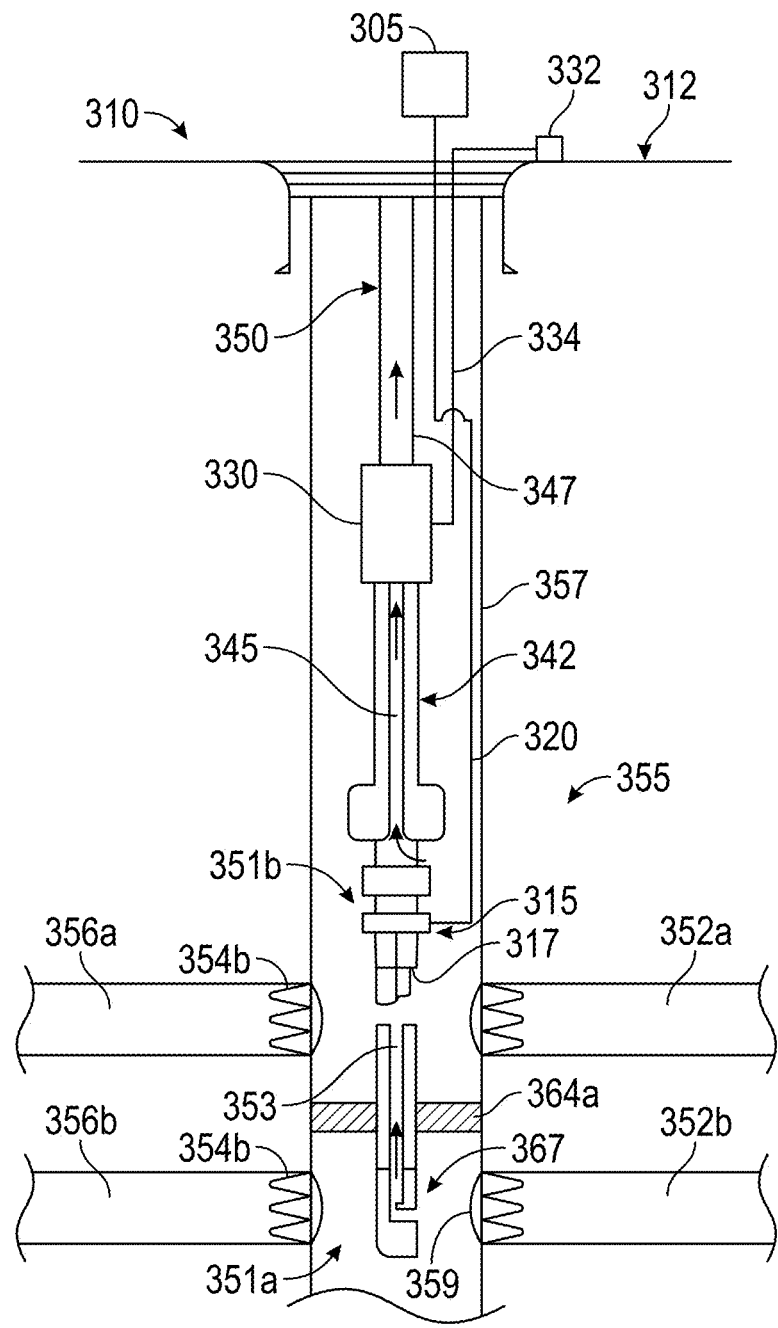
FIG. 3 shows a schematic illustration of a production system including a device in accordance with embodiments of the present disclosure.

FIG. 3 shows a schematic illustration of a production system including a device in accordance with embodiments of the present disclosure. FIG. 3 shows a well 350 that produces formation fluids 356a and 356b including hydrocarbons from two exemplary production zones, 352a (first production zone) and 352b (second production zone), respectively, in a formation 355. The well 350 is lined by casing 357. Perforations 354a adjacent the first production zone 352a and perforations 354b adjacent the second production zone 352b enhance formation fluid recovery. A packer 364a positioned above (uphole) of the second production zone perforations 354a isolates the second production zone 352b from the first production zone 352a. A screen 353 inhibiting solids, such as sand, from entering into the wellbore may be installed adjacent the perforations.

The formation fluid 356b from the second production zone 352b enters the annulus 351a of the well 350 through the perforations 354a and into a tubing 353 via a flow control valve 367. The formation fluid 356a from the first production zone 352a enters the annulus 351b (the annulus portion above the packer 364a) via perforations 354a. The formation fluid 356a enters production tubing or line 345 via ports 342.

In cases where the formation pressure is not sufficient to push the fluid 356a and/or fluid 356b to the surface, an artificial lift mechanism, such as an electrical submersible pump (ESP) or other lift system may be utilized to lift the fluids from the well to the surface 312. ESP 330 receives formation fluids 356a and 356b and pumps the fluids via tubing 347 to the surface 312. Two-way data communication may be provided between ESP 330 and ESP control unit 332 by cable 334. ESP control unit 332 may control the operation of ESP 330. ESP control unit 332 may include a processor configured to analyze and control the operations of ESP 330. ESP control unit 332 may be configured to alter pump speed of the ESP by sending control signals in response to data or instructions received from another controller.

Data communication lines run inside the well 350 to operate the various devices in the well 350 and to obtain measurements and other data from the various sensors in the well 350. A variety of other sensors may be placed at suitable locations in the well 350 to provide measurements or information relating to a number of downhole parameters of interest.

One or more sensor carriers, such as a carrier 315, may be placed in the production tubing to house any number of suitable sensors. The carrier 315 may include sensor array, denoted for convenience as 317 and comprising a variety of sensors, and a well controller 305 comprising electrical circuitry, both similar to those as described with respect to the system FIG. 1A. Data communication line 347 may transmit data from sensor arrays 317 to well controller 305 at the surface 312.

Relative Credence Indicator Value

Aspects of the present disclosure use a plurality of measurement types as described above to model the earth formation by assigning a relative credence indicator value to each measurement in dependence upon the corresponding measurement value. This association may be accomplished using a model incorporating known correlations between measurement values of a particular measurement type and a state.

In some embodiments, the model may include, but is not limited to, one or more of: (i) a mathematical equation, (ii) an algorithm, (iii) a function, (iv) a rule set, (v) a heuristic, and (vi) other relational techniques. The relative credence indicator value ('RCIV') is indicative of which state of the two states is more likely based on the corresponding measurement value and the relative likelihood of the likelier state. The value may be between −1 and 1. In some frameworks, a negative value indicates that the condition is probably not present, while a positive value indicates that the condition is probably present. A value near zero indicates that the sensor results are less compelling, while a value nearer −1 or 1 indicates a stronger case for the estimated state.

Referring again to the example of fluid typing, for every fluid component (e.g., gas, oil, water) an independent analysis of the sensor data may be performed. For each measurement of a particular sensor, a relative credence indicator value is assigned based on the measurement value. This may be carried out by converting the measurement value (e.g., density) by mapping the value (supplied as input) to the associated RCIV using the model.

FIGS. 4A-D graphically depict example models for assigning a relative credence indicator value ('RCIV') to each measurement in dependence upon the corresponding measurement value in accordance with embodiments of the present disclosure. The models are depicted as curves plotting the RCIV with respect to the measurement value (input).

Each model (400-480) is reflective of the state of a volume of an earth formation with respect to water. Positive values indicate a first state, where water is present ('water positive'); negative values contraindicate the presence of water (e.g., indicate a second state having an absence of water) ('water negative'); the RCIV corresponds with decreasing certainty as it approaches zero, and values near zero may be considered inconclusive.

Figure 4A:
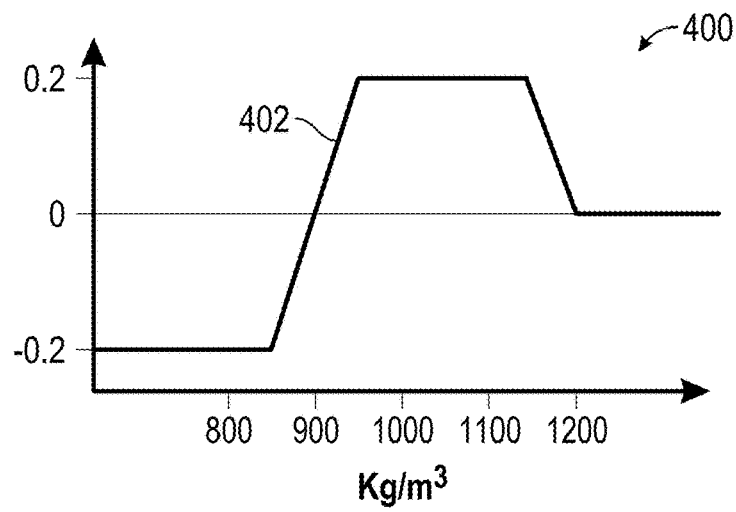
FIGS. 4A-D graphically depict example models for assigning a relative credence indicator value ('RCIV') to each measurement in dependence upon the corresponding measurement value in accordance with embodiments of the present disclosure.

Referring to FIG. 4A, the model 400 is depicted as a curve 402 plotting the appropriate relative credence indicator value with respect to the density measurement. The density measurement may be obtained using a resonant sensor, e.g., a "tuning fork". Several qualitative aspects of the model apparent from instant inspection comport with conventional knowledge of density readings. First, density values slightly above 1000 kg/m$^3$ support the presence of water because this is the expected value for water but not for oil. The model considers values slightly below 1000 kg/m$^3$, standing alone, as indecisive, because this might be a valid reading for heavy oil as well as low salinity water. Values much lower than 1000 kg/m$^3$ contradict the presence of water because of the relatively high density of water. Values much higher than 1000 kg/m$^3$ might indicate the measurement relates to mud or may indicate a defective sensor. As such, these values are considered indecisive. The maximum positive or negative value for a particular model may be modified using calibration coefficients. In some cases the positive and negative scales may be asymmetric.

Figure 4B:
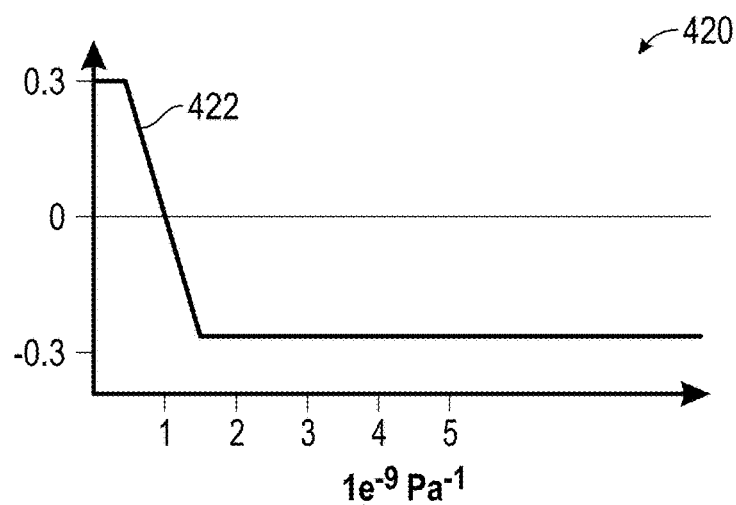

Referring to FIG. 4B, the model 420 depicts RCIV with respect to compressibility using curve 422. Positive values are again reflective of the likelihood of water being present. Of the liquids likely to be found downhole, water typically has the lowest compressibility, although some overlap with low GOR oil is possible. For model 420, the possible values for RCIV represent an interval between 0.3 and −0.3, inclusive. That is, the RCIV may have maximum positive and negative values of 0.3 and −0.3, respectively.

Figure 4C:
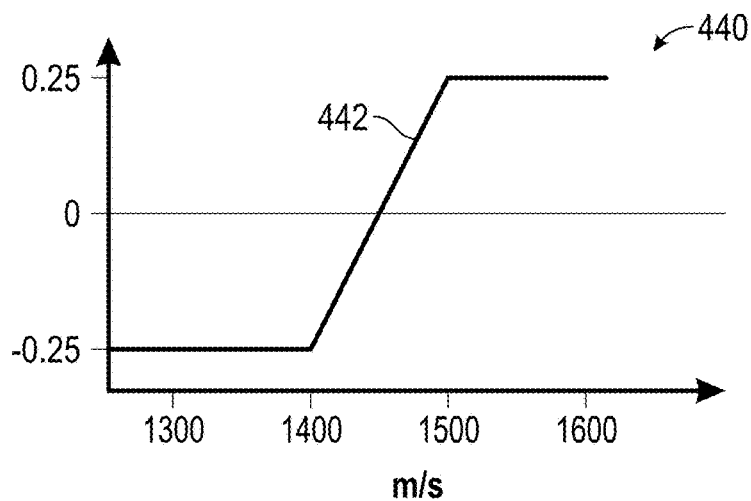

Referring to FIG. 4C, the model 440 depicts RCIV with respect to sound speed using curve 442. Sound speed of water is higher than sound speed of oil. For model 440, the possible values for RCIV represent an interval between 0.25 and −0.25, inclusive. That is, the RCIV may have maximum positive and negative values of 0.25 and −0.25, respectively.

Figure 4D:
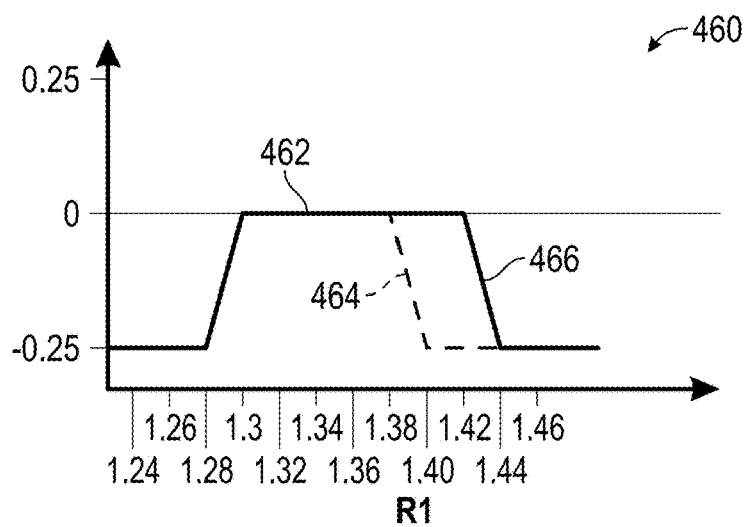

Referring to FIG. 4D, the model 460 depicts RCIV with respect to refractive index using curve 462. Over a range of environmental conditions, oil and water may have similar refractive index values. Values which are consistent with water are also consistent with oil. Whenever a value is measured which might indicate water, it could also be oil, so the indicator is indecisive. For values outside of the range consistent with water, the corresponding RCIV is negative.

It should be noted that over one section of the curve, the model produces different results depending on whether the measurements are made in connection with a borehole using oil-based mud ('OBM') or a water-based mud ('WBM'). Section 466 corresponds to OBM and section 464 corresponds to WMB. It is common in OBM operations for oil to stick to the glass window of a refractometer when water is being pumped. Thus, in OBM sometimes no water values are measured. So even if the measurement is in the oil range, this may not contradict the presence of water because it might be base oil sticking at the window. However, base oil can be excluded if the refractive index is very high, because base oil is always light (e.g., diesel-based) oil with a low refractive index. In WBM, the threshold may be set lower because base oil at the window can be excluded.

FIGS. 5A-D illustrate example RCIV association models indicative of the state of a volume of an earth formation with respect to natural gas in accordance with embodiments of the present disclosure. Positive values indicate a first state, where gas is present ('gas positive'); negative values contraindicate the presence of gas (e.g., indicate a second state having an absence of gas) ('gas negative').

Figure 5A:
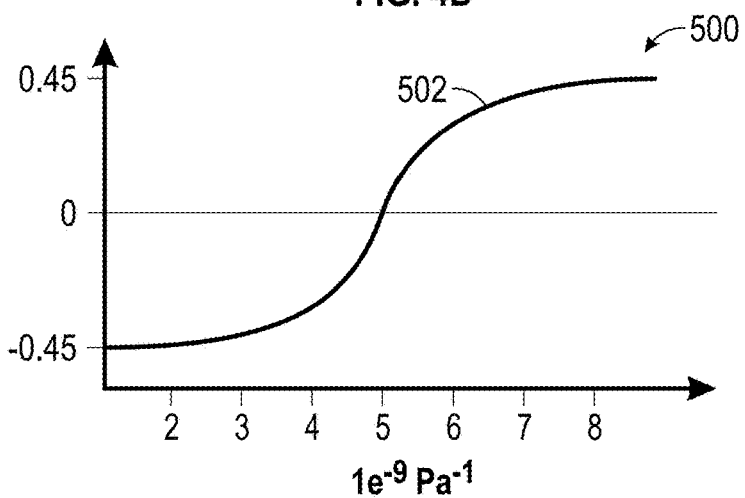
FIGS. 5A-D illustrate example RCIV association models indicative of the state of a volume of an earth formation with respect to natural gas in accordance with embodiments of the present disclosure.

FIG. 5A depicts model 500 as a curve 502 plotting the appropriate RCIV with respect to the compressibility measurement. Compressibility may be highly indicative of gas. Between dry gas and oil is a continuous range of fluids (wet gas, condensate, volatile oil) with a continuous compressibility range. Thus, determining a hard limit between oil and gas may not be possible.

The model uses a known empirical threshold of between 4 and 6 e$^{-9}$ Pa$^{-1}$, e.g., 4.85 e$^{-9}$ Pa$^{-1}$, with possible RCIV values extending over the interval of −0.45 to 0.45, inclusive. At the empirical threshold, the compressibility RCIV is set to zero (e.g., indecisive). At higher values the RCIV is positive, and at lower values it is negative.

Figure 5B:
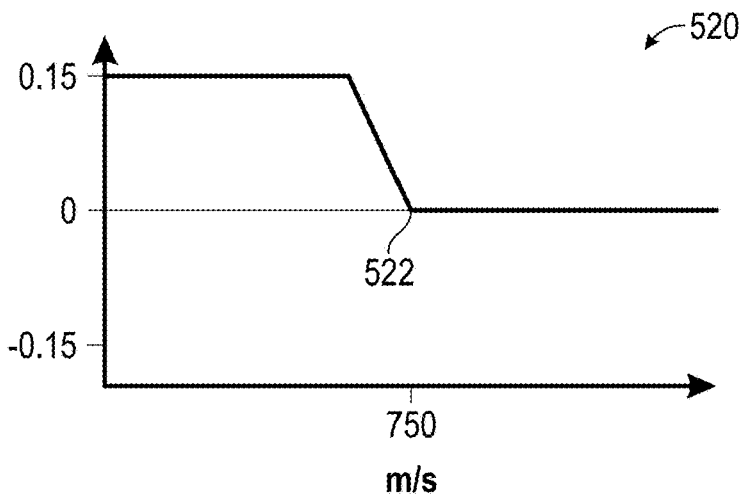
Figure 5C:
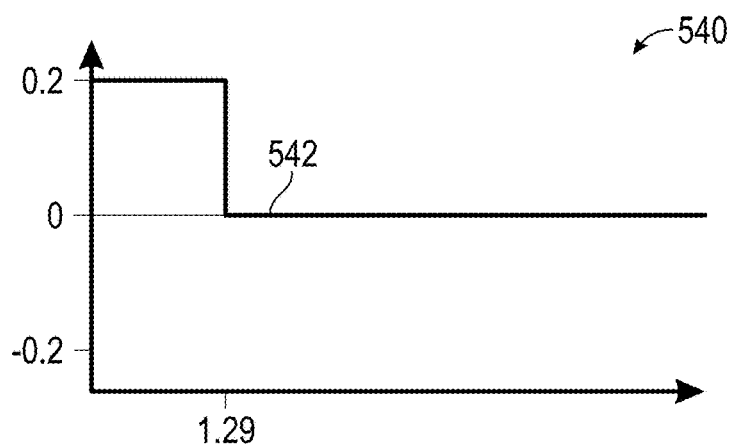
Figure 5D:
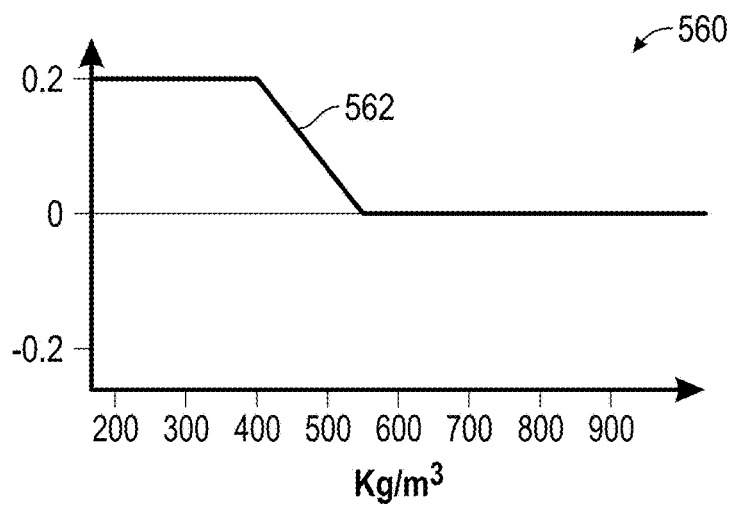

FIG. 5B depicts model 520 as a curve 522 plotting the appropriate RCIV with respect to the sound speed measurement. Assuming good measurements (lack of scatter, etc.), low measurement values are expected for a gas positive state. Measurement values above a threshold of 750 m/s are associated with indecisive RCIV values (e.g., zero), because the sound speed sensor sometimes measures the liquid part of the fluid despite the presence of gas. Lower values are associated with a positive result, with a maximum value of 0.15. FIG. 5C depicts model 540 as a curve 542 plotting the appropriate RCIV with respect to refractive index. FIG. 5D depicts model 560 as a curve 562 plotting the appropriate RCIV with respect to density. Density of gas is lower than the density of oil and water. Under extreme conditions, the resonant members of the "mechanical resonator" become fouled, so the measurement is higher than the true density value. So the model 560 treats a high density measurement as non-indicative.

FIGS. 6A-D illustrate example RCIV association models indicative of the state of a volume of an earth formation with respect to oil in accordance with embodiments of the present disclosure. Positive values indicate a first state, where oil is present ('oil positive'); negative values contraindicate the presence of oil (e.g., indicate a second state having an absence of oil) ('Coil negative'), and values near zero are indecisive.

Figure 6A:
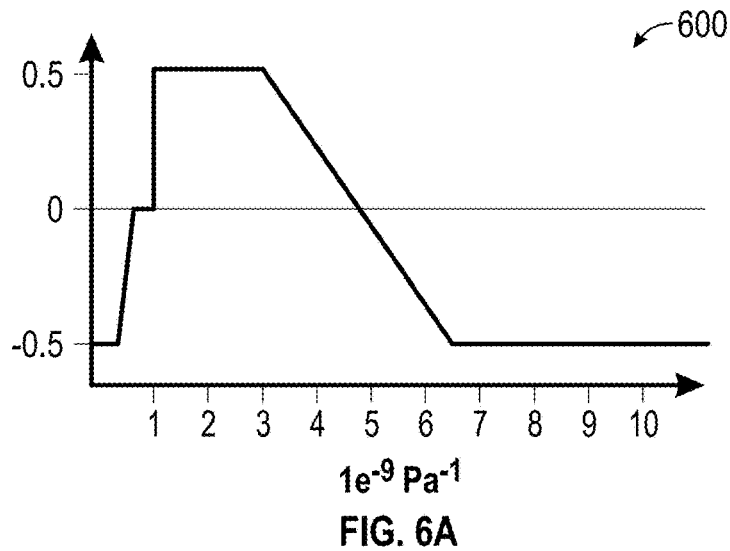
FIGS. 6A-D illustrate example RCIV association models indicative of the state of a volume of an earth formation with respect to oil in accordance with embodiments of the present disclosure.
Figure 6B:
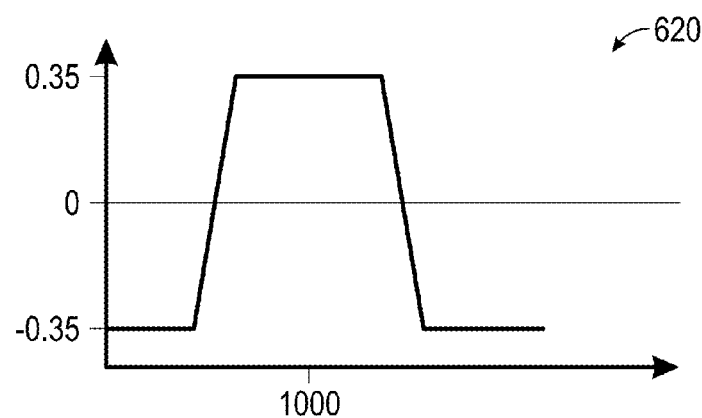
Figure 6C:
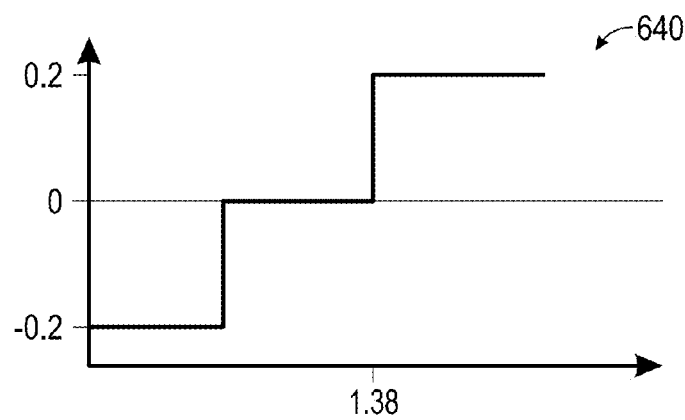
Figure 6D:
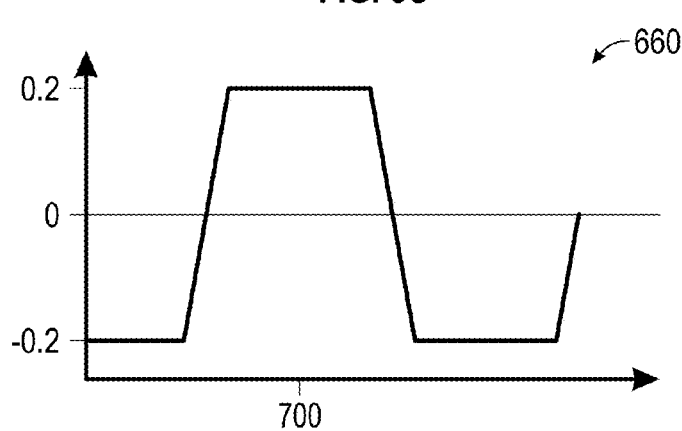

FIG. 6A depicts model 600 as a curve plotting the appropriate RCIV with respect to the compressibility measurement. The compressibility range of oil lies between water and gas. There is a soft transition between oil and gas, and there is a small overlap between low GOR oil and water. FIG. 6B depicts model 620 as a curve plotting the appropriate RCIV with respect to the sound speed measurement. Assuming good measurements (lack of scatter, etc.), the compressibility range of oil lies between water and gas. FIG. 6C depicts model 640 as a curve plotting the appropriate RCIV with respect to refractive index. The refractive index has a large overlap between water and light oil where the result is indecisive. FIG. 6D depicts model 660 as a curve plotting the appropriate RCIV with respect to density. Oil density is also between gas and water. In some examples, a known sensor bias under certain conditions can be taken into account, leading to a threshold which is smaller than the theoretically physically correct value, as shown here.

Estimating State of the Volume

The state of the volume with respect to each condition may be estimated using the relative credence indicator value for each of the plurality of measurements with respect to the condition. The RCIVs from the plurality of measurements may be mathematically processed, such as, for example, by finding their sum, a weighted sum, an average, a weighted average, and so on, to provide a state indicator value. The state indicator value may then be compared to thresholds to estimate the state and the relative likelihood. The thresholds may be stored in a data table or the like. In embodiments, the RCIVs may be processed using a threshold rule set to estimate the state based on the particular combination of RCIVs. In some models, the evaluations may be independent, as shown above, so there may be instances where there is no support for any of the fluid types because all sensors contradict each other or are indecisive. In other variants, the estimations of the states may be dependent upon one another, e.g. a measurement indicating a state lacking water may result in an increase in the likelihood of estimating positive gas and oil states.

As one example, the state indicator value may be calculated using the sum:

$$SIV_z = a_1 * R_1 + a_2 * R_2 + a_3 * R_3 + a_4 * R_4 + \ldots + X$$

where $SIV_z$ is the state indicator estimated using a number of measurements, z, and $a_i$ (for i=1 to z) are weighting coefficients associated with a particular measurement, where i and z are whole real numbers. $R_i$ (for i=1 to z) are the RCIVs corresponding to the measurement. X may be a modifier determined from environmental conditions or other situational alterations. In other embodiments, the state indicator value may be determined by dividing the sum by the number of measurements, or by other proprietary calculations as will occur to those of skill in the art. In one example the default coefficient for $a_1$ is 1, and X is zero.

In an example wherein the framework correlates positive RCIVs with a first state wherein a fluid is present, estimating the state of the volume as the first state may be carried out if i) the state indicator lies in a first region between the intermediate point and the first endpoint (e.g., between 0 and 1) or ii) the state indicator lies in a second region outside the interval past a threshold value beyond the first endpoint from the intermediate point (e.g., greater than a threshold, where the threshold is greater than 1). In an example wherein the framework correlates positive RCIVs with a second state wherein a fluid is absent, estimating the state of the volume as the second state may be carried out if i) the state indicator lies in a third region between the intermediate point and the second endpoint (e.g., between 0 and −1); or ii) the state indicator lies in a fourth region outside the interval past a threshold value beyond the second endpoint from the intermediate point (e.g., less than a threshold, where the threshold is less than −1). As one example, the relative thresholds may be 1.5 and −2, respectively, wherein there are four measurements.

Display

Aspects of the present disclosure include the generation of a graphical display representing a model of a volume of an earth formation estimated in accordance with the techniques disclosed herein. More particularly, the estimated state and the relative likelihood of the estimated state may be represented. The display may be dynamically updated as new information is accumulated, and illustrate a recent history of the state indicator or of the state. The updating may occur in substantially real-time.

Figure 7A:
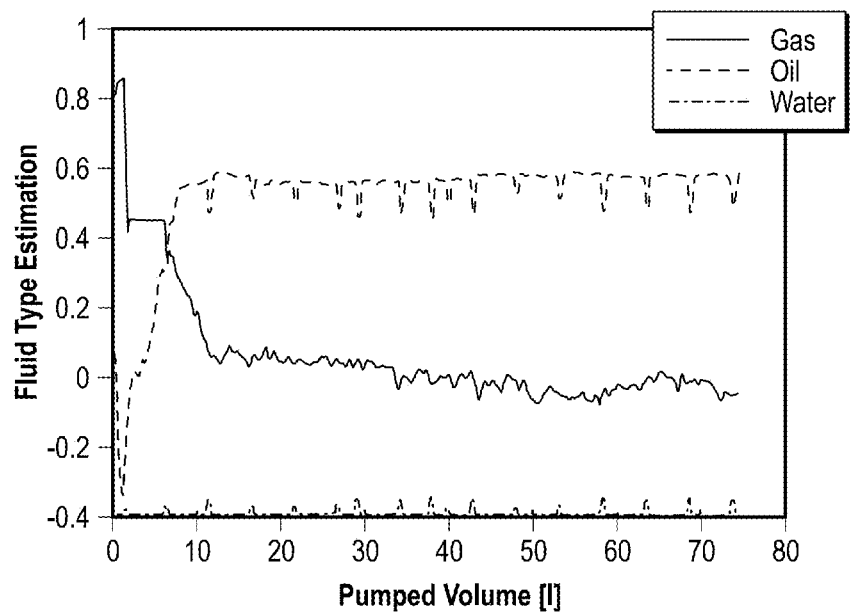
FIG. 7A illustrates a graphical display of dynamic state indicator values for water, oil, and natural gas in fluid pumped over time with respect to the total pumped volume of fluid.

FIG. 7A illustrates a graphical display of dynamic state indicator values for water, oil, and natural gas in fluid pumped over time with respect to the total pumped volume of fluid. The display corresponds to oil sampling in WBM. For every fluid component (gas, oil, and water), an independent analysis of the sensor data is performed as described above. In this case, for each component the associated RCIVs are summed. The results are a single number for each component approximately between −1 and 1. A negative value indicates that the component is probably not present in the fluid. A positive value indicates that the component is probably part of the fluid. A value near zero indicates that the sensor results are conflicting about the component.

At the beginning of the measurement cycle corresponding to lower pumped volume values, water value is the highest and the other values are far below zero. This indicates pure water. Towards the end of the measurement cycle corresponding to higher pumped volume values, oil is positive, gas is still negative and water is in the indecisive range.

Figure 7B:
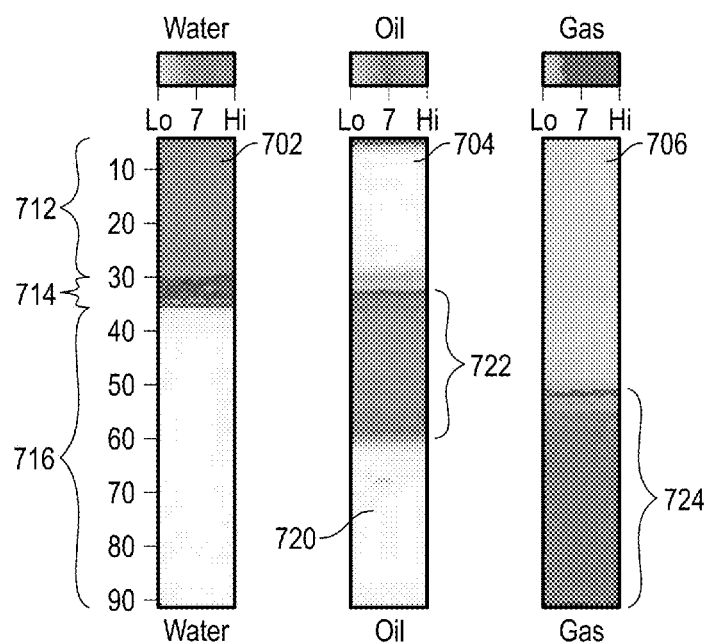
FIG. 7B illustrates a graphical display of the estimated state of a volume and the relative likelihood in accordance with embodiments of the present disclosure.

FIG. 7B illustrates a graphical display of the estimated state of a volume and the relative likelihood in accordance with embodiments of the present disclosure. The state is represented using a graphical state indicator 720. In FIG. 7B, the graphical state indicator 720 comprises an area of display rendering a particular graphic associated with the combination of state and likelihood of that state. The single graphic indicates the estimated state and the likelihood. This graphic may be a particular color (e.g., a particular shade variation of the primary color red), a particular pattern, and so on.

The display of FIG. 7B comprises a first graph 702 comprising graphical state indicators with respect to water, a second graph 704 comprising graphical state indicators with respect to oil, and a third graph 706 comprising graphical state indicators with respect to natural gas. As shown here, each graphical state indicator 720 comprises a bar associated with a particular period of time, total amount of fluid pumped, or other metric. In this example, the bar indicates the estimated state and the likelihood using color. In combination, the graphical state indicators for each graph display the time-varying status of the estimated state and relative certainty of that estimation for the respective condition.

The first graph 702 represents a positive state indication using a blue color scale comprising varying shades of the color blue. The second graph 704 represents a positive state indication using a green color scale comprising varying shades of the color green. The third graph 706 represents a positive state indication using a red color scale comprising varying shades of the color red. For each graph, the shades of the primary color transition from lighter shades at the more positive end of the state indicator values (relatively more certainty) to darker shades as the state indicator value approaches zero (less certainty).

Each graph represents a negative state indication using a fourth color scale comprising a shade of a color lacking a primary color (e.g., white). The shades transition from lighter shades at the more negative end of the state indicator values to darker shades as the state indicator value approaches zero. That is, white and lighter gray may be interpreted as the component probably not being part of the fluid; dark grey, black, and low saturated color as ambiguous regarding the component's presence; and pure color as the component probably being present in the fluid.

Thus, an operator may quickly ascertain the estimated states and the strength of the estimation with respect to each condition by looking at the chart. Areas of white represent periods of strong negative indications as to the condition, while bright colored areas represent strong positive indications. One important feature is that all values may be negative simultaneously, representing a lack of any of the components being tested for.

During a first time period 712, the graph 702 displays a series of graphical indicators (bars) consisting of bright shades of blue, which together have the cumulative effect of a large block of bright blue that indicates an interval with an estimated state of the volume as water positive with high certainty. That is, the state of the volume is estimated to be in a condition of water being present with the data strongly indicating the presence of water. As time passes, a second time period 714 is entered in which the graph 702 displays a series of graphs (bars) having progressively darker shades of blue until the color is completely black, and then transitioning to dark grey (e.g., white with heavy darkness). The graphical indicators of the second time period 714 reflect state indicator values close to zero, and thus low certainty. These graphical indicators also reflect a transition from positive state indicator values to negative state indicator values. In a third time period 716, the graph 702 displays a series of very light grey (e.g., white with very little darkness) or white indicators, which together have the cumulative effect of a large block of light shaded region (devoid of primary color shades) that indicates an interval with an estimated state of the volume as water negative with high certainty. That is, the state of the volume is estimated to be in a condition of water being absent with the data strongly indicating the absence of water.

Figure 7C:
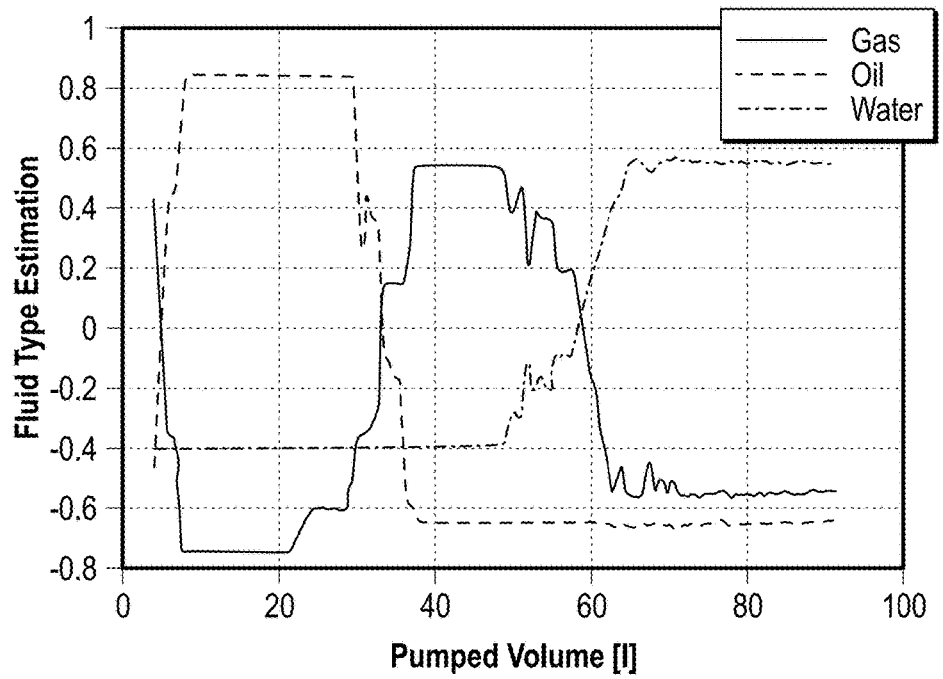
FIG. 7C illustrates a graphical display of dynamic state indicator values for water, oil, and natural gas in fluid pumped over time with respect to the total pumped volume of fluid.

Referring to FIGS. 7C & 7B, it is evident that in the first period 712, water is probably present and the other components absent in the fluid, in a fourth period 722 oil is probably present and the other components absent in the fluid, and in a fifth period 724 gas is probably present and the other components absent in the fluid.

The example embodiments described are not limiting. Other color schemes or pattern schemes may be employed, wherein different colors may be used other than primary colors, light colors may indicate low certainty, a color other than white (e.g., yellow) may be used to reflect negative state indicator values, each component may use the same color scheme, shading rather than darkening may be used as certainty values change, or multiple colors may be uses to show transitions (e.g., the traditional red, orange, yellow, green, blue, indigo, violet color scale), and so on.

Auxiliary Heuristics

Auxiliary heuristics may be used in particular cases to increase the accuracy of the models. These heuristics may include modification of an RCIV according to a rule set specific to a particular measurement type and including one or more rules. Each rule may include one or more rule inputs, or conditions, necessary to trigger the rule and produce the modification. Conditions may include, alone or in combination, the measurement value corresponding to the RCIV, other measurement values (e.g., previous or subsequent measurement values, values from measurements from other sensors), operational parameters (e.g., drilling parameters, mud parameters, and the like), wellbore or formation conditions, a priori data regarding the wellbore, the earth formation or the tool, ground truth, and so on. For example, conditions may include the sensor type (e.g., particular model or particular tool), the environmental conditions, mud type, sensor health, noise level and other things which might influence the accuracy and reliability of a sensor. Modification of the RCIV may be carried out in accordance with any technique known in the data processing arts, including, for example, via application of a weighting coefficient (e.g., including positive or negative values less than or greater than one), curve truncation, cap value, floor value, additive or subtractive adjustment, or setting of the RCIV to a predetermined value.

As one example, referring back to FIGS. 4C, 5A, the quality and accuracy of compressibility readings are dependent on sufficient overbalance pressure. Some pumps may require a minimum overbalance to be able to measure compressibility properly. In such cases, an additional heuristic may be employed to modify the RCIV according to overbalance. For example, the maximum weight of 0.4 may only reached when the overbalance pressure is at least 50 bar, and a weight of zero may be applied when overbalance is less than 15 bar, with a linear slope controlling weights for intermediate overbalance values.

Other examples include auxiliary heuristics with respect to the sound speed measurement. When the system is pumping gas, the sound speed sensor may deliver invalid data (e.g., physically impossible results) or produces measurements scattered all over the measurement range. However, similar scattering behavior occurs in immiscible fluids. To increase accuracy, an auxiliary heuristic may be employed which tests for scattering and produces RCIV values of zero if scatter is detected. Scatter may be detected by first removing all invalid data, e.g., by removing data outside of expected minimum and maximum thresholds, or data lying outside standard deviation or other statistical thresholds, followed by confirming that the range of values during the last minute exceeds 50 m/s and there are at least two good values.

Additionally or alternatively, a plurality of alternative models may be available for a particular measurement. One model of the plurality may be selected for use in determining the RCIV, and selection of the particular model to be used may be carried out using a rule set and dependent upon one or more of the conditions above, including logical combinations of conditions.

In embodiments, heuristics may be built into a sensor. For particular refractometers, the refractive index of gas is out of the measurement range of the refractometer. Nevertheless the refractometer may feature a gas detection algorithm which delivers a predetermined value when gas is detected. This measurement is thus a false measurement, valuable only in signaling the presence of gas.

The predetermined value is not consistent with water or oil presence, and thus may be may be unique to positive gas detection. However, because a tiny drop or film of liquid on the glass window is enough to deliver the refractive index of the liquid, the refractometer may not consistently deliver this signal value in the presence of gas. Additional heuristics may be used to mitigate this phenomenon.

Figure 8A:
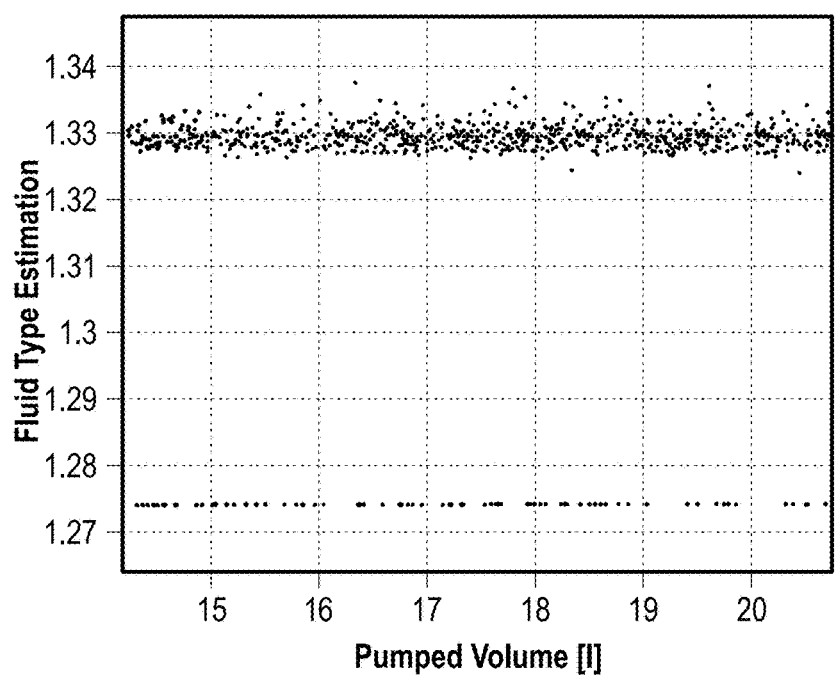
FIG. 8A shows refractometer data in accordance with embodiments of the present disclosure.

For example, FIG. 8A shows raw refractometer data with respect to the total pumped volume. FIG. 8A shows refractometer data alternating between a band of values around 1.33 consistent with water and a predetermined gas value. Since there is only a single refractometer value indicating gas, a heuristic setting the RCIV indicator to a positive value whenever this value occurs may be employed to increase accuracy. Referring again to FIG. 5C, this heuristic may otherwise set the RCIV to zero when scatter is detected, because despite the presence of gas, the refractometer might deliver any other value. An additional long low-pass filter may be employed to correct the scatter.

Referring back to FIG. 4C, in other examples, if the sensor is scattering and no data is available, the mud type may used to determine the result. For example, in WBM the sound speed sensor usually does not scatter when water is being pumped. Thus, scattering detection may result in setting the RCIV to a negative value (e.g., −0.15). However, OBM scatter may be consistent with either water or gas. Thus, scattering detection may result in setting the RCIV to zero.

Figure 8B:
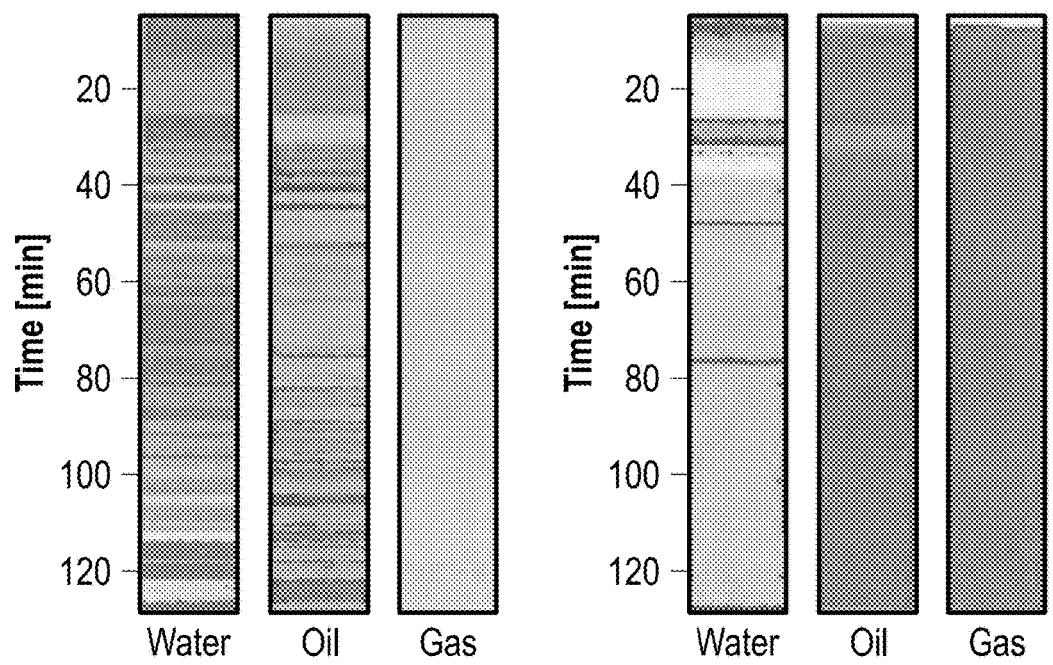
FIG. 8B illustrates a graphical display with respect to two sets of state indicators values resulting from two different methods of processing sensor data in accordance with embodiments of the present disclosure.

FIG. 8B illustrates a graphical display with respect to two sets of state indicators values resulting from two different methods of processing sensor data in accordance with embodiments of the present disclosure. A comparison between the display of the first set of state indicators 850 and the second set of state indicators 851 demonstrate the effects of auxiliary heuristics in accordance with aspects of the present disclosure. Particular environmental conditions during the acquisition of measurements using various sensors included the failure of a vibrational sensor (e.g., tuning fork). Additionally, the refractive index of the fluid is in the valid range for oil and water. Overbalance may affect compressibility data. The second set of state indicators is derived using a heuristic which, in response to the detection of low overbalance, reduces the influence of compressibility, such as, for example, by modifying the RCIV for compressibility with a lower coefficient than for the other measurements during summation. As a result, the second set 851 produces a better estimation by correctly identifying the presence of oil (with low confidence). The first data set 850 maintains a traditional weight for overbalance, which leads to unclear results for all fluid components.

Figure 9:
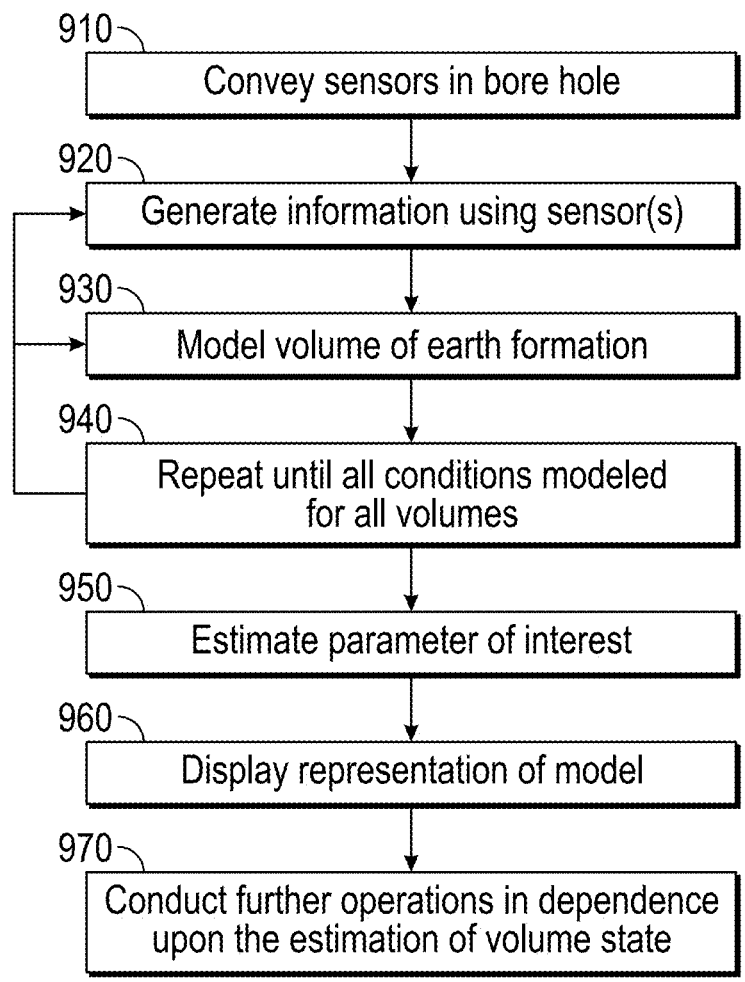
FIG. 9 shows, in flow chart form, methods for evaluating an earth formation intersected by a borehole in accordance with embodiments of the present disclosure.

FIG. 9 shows, in flow chart form, methods 900 for evaluating an earth formation intersected by a borehole in accordance with embodiments of the present disclosure.

Method 900 may include optional step 910, conveying at least one sensor into a borehole. At optional step 920, the method includes making a plurality of measurements corresponding to a plurality of measurement types using the at least one sensor. A particular measurement type may include estimation of a particular parameter, e.g., density, resistivity, sound speed, acoustic impedance, and so on. Often the measurements of differing measurement types are taken using different sensors, e.g., an FMR sensor, a photodiode sensor, a galvanic assembly, an acoustic transducer, etc. However, the same sensor (e.g., an acoustic transducer) may be used to take measurements of more than one type—for example, sound speed and acoustic impedance. Step 920 may include generating information using the sensor and processing the information. In the case of information relating to a downhole fluid, step 920 may include collecting the downhole fluid in a sample chamber on the tool.

Step 930 includes modeling a volume of the earth formation proximate the borehole as being in one of two states using a plurality of measurements corresponding to a plurality of measurement types. A first state of the two states corresponds with presence of a condition associated with the formation, and a second state of the two states corresponds with absence of the condition. Thus, the model may consist of only those volumes in the first state, only those volumes in the second state, or volumes corresponding to each of the states. For example, in some embodiments only the volumes corresponding with the presence of the condition may be maintained, stored, manipulated, displayed, and so on.

Step 930 may be carried out by assigning a relative credence indicator value ('RCIV') to each measurement in dependence upon the corresponding measurement value, and using the RCIV for each of the plurality of measurements to estimate the state of the volume. At optional step 940, step 930 may be repeated for additional conditions and/or additional volumes.

At optional step 950, the method may include estimating a parameter of interest of the earth formation using the collected information. The parameter of interest may be applied to the model.

In optional step 960, the method may include displaying a representation of the model resulting from the modeling. This may be carried out by displaying a first color scale in connection with sums lying in the first region and the second region; and displaying a second color scale in connection with a sums lying in the third region and the fourth region.

In optional step 970, the method may include conducting further operations in the earth formation in dependence upon the estimation. Further operations may include at least one of: i) extending the borehole; ii) drilling additional boreholes in the formation; iii) performing seismic measurements on the formation; iv) performing borehole logging in the formation; v) installing casing in the borehole; vi) evaluating casing installed in the borehole; and vii) producing one or more hydrocarbons from the formation. This may be carried out by conducting further operations in dependence upon the model in which the estimation has been incorporated.

The term "carrier" as used in this disclosure means any device, device component, combination of devices, media and/or member that may be used to convey, house, support or otherwise facilitate the use of another device, device component, combination of devices, media and/or member. Illustrative carriers include wirelines, wireline sondes, slickline sondes, e-lines, jointed drill pipe, coiled tubing, wired pipe, casing, liners, drop tools, and so on.

As used herein, the term "fluid" and "fluids" refers to one or more gasses, one or more liquids, and mixtures thereof.

A "downhole fluid" as used herein includes any gas, liquid, flowable solid and other materials having a fluid property and relating to hydrocarbon recovery. A downhole fluid may be natural or man-made and may be transported downhole or may be recovered from a downhole location. Non-limiting examples of downhole fluids include drilling fluids, return fluids, formation fluids, production fluids containing one or more hydrocarbons, oils and solvents used in conjunction with downhole tools, water, brine, and combinations thereof. An "engineered fluid" may be used herein to mean a human made fluid formulated for a particular purpose. Fluid type may refer to a particular category of fluid, such as, for example, those substances in a particular phase (e.g., liquid phase), a recoverable hydrocarbon type (e.g., oil, natural gas), particular hydrocarbon (e.g., methane), and so on.

The term "substantially real-time" as applied to methods of the present disclosure refers to an action performed (e.g., estimation, modeling, and so on) while the sensor is still downhole, after the generation of the information and prior to movement of the sensor of a distance of 100 meters, 50 meters, 25 meters, 10 meters, 1 meter, or less; and may be defined as estimation of the parameter of interest or production of the current iteration of a model within 15 minutes of generating the information, within 10 minutes of generation, within 5 minutes of generation, within 3 minutes of generation, within 2 minutes of generation, within 1 minute of generation, or less.

As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

While the foregoing disclosure is directed to the one mode embodiments of the disclosure, various modifications will be apparent to those skilled in the art. It is intended that all variations be embraced by the foregoing disclosure.

What is claimed is:

1. A method of evaluating an earth formation intersected by a borehole, the method comprising:
   modeling a volume of the earth formation proximate the borehole as being in one of two states using a plurality of measurements corresponding to a plurality of measurement types, wherein:
      a first state of the two states corresponds with presence of a condition associated with the formation, and
      a second state of the two states corresponds with absence of the condition,
      wherein the modeling includes:
         assigning a relative credence indicator value to each measurement in dependence upon the corresponding measurement value, the relative credence indicator value indicative of which state of the two states is more likely based on the corresponding measurement value and the relative likelihood of the likelier state; and
         using the relative credence indicator value for each of the plurality of measurements to estimate the state of the volume; and
      displaying a representation of a model resulting from the modeling on a display, wherein displaying the representation comprises:
         displaying a first color scale in the display if the estimated state corresponds to the first state; and
         displaying a second color scale in the display if the estimated state corresponds to the second state.

2. The method of claim 1 wherein the condition comprises presence of a fluid in the formation having a selected fluid type.

3. The method of claim 1 wherein the selected fluid type comprises at least one of i) water; ii) oil; and iii) natural gas.

4. The method of claim 1 wherein each relative credence indicator value is a numerical value in an interval, the interval comprising:
   i) a first endpoint representing absolute certainty that the volume is in the first state,
   ii) a second endpoint representing absolute certainty that the condition is in the second state, and
   iii) an intermediate point on the interval between the endpoints representing absolute uncertainty with regard to the present state of the volume.

5. The method of claim 4 comprising estimating the state of the volume using a state indicator value derived from the relative credence indicator values corresponding to the plurality of measurements.

6. The method of claim 5 further comprising estimating the state of the volume as the first state in response to at least one of: i) the state indicator value lies in a first region between the intermediate point and the first endpoint; and ii) the state indicator value lies in a second region outside the interval past a threshold value beyond the first endpoint from the intermediate point.

7. The method of claim 6 further comprising estimating the state of the volume as the second state in response to at least one of: i) the state indicator value lies in a third region between the intermediate point and the second endpoint; and ii) the state indicator value lies in a fourth region outside the interval past a threshold value beyond the second endpoint from the intermediate point.

8. The method of claim 7 further comprising displaying a representation of a model resulting from the modeling, wherein the representation comprises:
   displaying the first color scale in connection with state indicator values lying in the first region and the second region; and
   displaying the second color scale in connection with state indicator values lying in the third region and the fourth region.

9. The method of claim 4 wherein the interval includes both positive and negative values.

10. The method of claim 1 wherein the relative credence indicator value assigned to the corresponding measurement value is indicative of which state of the two states is more likely based solely on the corresponding measurement value.

11. The method of claim 1 wherein using the relative credence indicator value for each of the plurality of measurements comprises using the value independent of the corresponding measurement value.

12. The method of claim 1 further comprising conducting further operations in the earth formation in dependence upon the estimation.

13. The method of claim 12 wherein the further operations comprise at least one of: i) extending the borehole; ii) drilling additional boreholes in the formation; iii) performing seismic measurements on the formation; iv) performing borehole logging in the formation; v) installing casing in the borehole; vi) evaluating casing installed in the borehole; and vii) producing one or more hydrocarbons from the formation.

14. The method of claim 1 wherein using the relative credence indicator value for each of the plurality of measurements to estimate the state of the volume comprises individually weighting the relative credence indicator value for each of the plurality of measurements.

15. The method of claim 14 wherein the relative credence indicator values are weighted responsive to at least one of: i) indication of sensor failure; ii) borehole conditions; iii) predicted state; and iv) estimated state for a different condition.

16. An apparatus for evaluating an earth formation intersected by a borehole, the apparatus comprising:
a display;
at least one processor configured to:
model a volume of the earth formation proximate the borehole as being in one of two states using a plurality of measurements corresponding to a plurality of measurement types, wherein:
a first state of the two states corresponds with presence of a condition associated with the formation, and
a second state of the two states corresponds with absence of the condition,
wherein the modeling includes:
assigning a relative credence indicator value to each measurement in dependence upon the corresponding measurement value, the relative credence indicator value indicative of which state of the two states is more likely based on the corresponding measurement value and the relative likelihood of the likelier state; and
using the relative credence indicator value for each of the plurality of measurements to estimate the state of the volume; and
display a representation of a model resulting from the modeling on the display, including:
displaying a first color scale in the display if the estimated state corresponds to the first state; and
displaying a second color scale in the display if the estimated state corresponds to the second state.

17. The apparatus of claim 16 further comprising:
a carrier conveyed in a borehole;
a first sensor associated with the carrier and configured to make a first portion of the plurality of measurements; and
a second sensor associated with the carrier and configured to make a second portion of the plurality of measurements.

18. The apparatus of claim 17 wherein the first sensor is configured to make measurements of a first type and the second sensor is configured to make measurements of a second type.

* * * * *